(12) United States Patent
Xu et al.

(10) Patent No.: US 9,113,462 B2
(45) Date of Patent: Aug. 18, 2015

(54) RESOURCE MAPPING FOR EPDCCH IN LTE

(71) Applicant: QUALCOMM INCORPORATED, San Diego, CA (US)

(72) Inventors: Hao Xu, San Diego, CA (US); Wanshi Chen, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 127 days.

(21) Appl. No.: 13/875,129

(22) Filed: May 1, 2013

(65) Prior Publication Data

US 2013/0294362 A1 Nov. 7, 2013

Related U.S. Application Data

(60) Provisional application No. 61/642,402, filed on May 3, 2012.

(51) Int. Cl.
*H04W 72/04* (2009.01)
*H04L 5/00* (2006.01)

(52) U.S. Cl.
CPC ........... *H04W 72/042* (2013.01); *H04L 5/0053* (2013.01); *H04L 5/0062* (2013.01); *H04L 5/0023* (2013.01); *H04L 5/0044* (2013.01); *H04L 5/0048* (2013.01); *H04L 5/0073* (2013.01)

(58) Field of Classification Search
None
See application file for complete search history.

(56) References Cited

U.S. PATENT DOCUMENTS

| 8,340,199 | B2 | 12/2012 | Nam et al. | |
|---|---|---|---|---|
| 8,345,566 | B2 | 1/2013 | You et al. | |
| 2010/0189038 | A1* | 7/2010 | Chen et al. | 370/328 |
| 2011/0007695 | A1 | 1/2011 | Choi et al. | |
| 2011/0170496 | A1* | 7/2011 | Fong et al. | 370/329 |
| 2012/0106465 | A1* | 5/2012 | Haghighat et al. | 370/329 |
| 2012/0208547 | A1 | 8/2012 | Geirhofer et al. | |
| 2012/0250551 | A1 | 10/2012 | Sartori et al. | |
| 2013/0039284 | A1* | 2/2013 | Marinier et al. | 370/329 |
| 2013/0044727 | A1* | 2/2013 | Nory et al. | 370/330 |
| 2013/0201926 | A1* | 8/2013 | Nam et al. | 370/329 |
| 2013/0286967 | A1* | 10/2013 | Ji et al. | 370/329 |
| 2014/0071934 | A1* | 3/2014 | Frenne et al. | 370/330 |

OTHER PUBLICATIONS

Bell A.S., et al., "Handling of REMapping for ePDCCH in Presence of Legacy Signals", 3GPP Draft, R1-122496 Handling of Re Mapping for ePDCCH in Presence of Legacy Signals, 3rd Generation Partnership Project (3GPP), F-96921 Sophia-Antipolis Cedex, France, vol. RAN WG1, No. Prague, May 12, 2012, XP050601068.
International Search Report and Written Opinion—PCT/US2013/039251—ISA/EPO—Aug. 8, 2013.

(Continued)

*Primary Examiner* — Kodzovi Acolatse
(74) *Attorney, Agent, or Firm* — Seyfarth Shaw LLP

(57) ABSTRACT

A method of wireless communication includes resource mapping for an enhanced physical downlink control channel (ePDCCH) or a physical downlink shared channel (PDSCH). A set of non-colliding resources and a set of colliding resources are determined. Code symbols are mapped for a channel first to the set of non-colliding resources and then to the set of colliding resources.

3 Claims, 9 Drawing Sheets

(56) References Cited

OTHER PUBLICATIONS

LG Electronics: "Handling of mapping of ePDCCH in presence of other signals", 3GPP Draft, R1-122307 Handling of Mapping of ePDCCH in Presence-of Other Signals LG, 3rd Generation Partnership Project (3GPP), Mobile Competence Centre, Route Des Lucioles, F-06921 Sophia-Antipolis Cedex, France, vol. RAN WG1, No. Prague, Czech Republic, May 12, 2012, XP050600570.

MCC Support: "Draft Report of 3GPP TSG RAN WG1 #68bis v0.1.0", 3GPP Draft; Draft ReportWG1#68B V010, 3rd Generation Partnership Project T3GPP, Mobile Competence Centre, Route Des Lucioles, F-06921 Sophia-Antipolis Cedex, France, vol. RAN WG1, No. Prague, Czech Republic, Apr. 5, 2012, R1-121870, R1-121873, R1-121862, R1-121874, XP050600224.

NTT Docomo: Views on Resource Mapping for ePDCCW, 3GPP Draft, R1-121977 Mapping for E-PDCCH, 3rd Generation Partnership Project (3GPP), Mobile Competence Centre, Route Des Lucioles, F-06921 Sophia-Antipolis Cedex, vol. RAN WG1, No. Prague, May 12, 2012, XP050601030.

* cited by examiner

RESOURCE MAPPING FOR EPDCCH IN LTE

CROSS-REFERENCE TO RELATED APPLICATION

This application claims the benefit under 35 U.S.C. §119(e) to U.S. Provisional Patent Application No. 61/642,402 entitled "RESOURCE MAPPING FOR ePDCCH in LTE," filed on May 3, 2012, the disclosure of which is expressly incorporated by reference herein in its entirety.

BACKGROUND

1. Field

Aspects of the present disclosure relate generally to wireless communication systems, and more particularly to resource mapping, for example for an enhanced physical downlink control channel (ePDCCH).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes determining a set of non-colliding resources and a set of colliding resources. The method also includes mapping code symbols for a channel first to the set of non-colliding resources and then to the set of colliding resources.

Another aspect discloses wireless communication having a memory and at least one processor coupled to the memory. The processor(s) is configured to determine a set of non-colliding resources and a set of colliding resources. The processor(s) is also configured to map code symbols for a channel first to the set of non-colliding resources and then to the set of colliding resources.

Another aspect discloses a computer program product for wireless communications in a wireless network having a non-transitory computer-readable medium. The computer readable medium has non-transitory program code recorded thereon which, when executed by the processor(s), causes the processor(s) to perform operations of determining a set of non-colliding resources and a set of colliding resources. The program code also causes the processor(s) to map code symbols for a channel first to the set of non-colliding resources and then to the set of colliding resources.

Another aspect discloses an apparatus including means for determining a set of non-colliding resources and a set of colliding resources. Also disclosed is a means for mapping code symbols for a channel first to the set of non-colliding resources and then to the set of colliding resources.

In another aspect, a method of wireless communications is disclosed and includes generating a first mapping of a first set of resource elements to a first channel. The first channel comprises an enhanced physical downlink control channel (ePDCCH) or a physical downlink shared channel (PDSCH). The method also includes generating a second mapping of a second set of resource elements to the first channel and transmitting the first channel in accordance with one of the mappings.

Another aspect discloses wireless communication having a memory and at least one processor coupled to the memory. The processor(s) is configured to generate a first mapping of a first set of resource elements to a first channel. The first channel comprises an enhanced physical downlink control channel (ePDCCH) or a physical downlink shared channel (PDSCH). The processor is also configured to generate a second mapping of a second set of resource elements to the first channel and to transmit the first channel in accordance with one of the mappings.

Another aspect discloses a computer program product for wireless communications in a wireless network having a non-transitory computer-readable medium. The computer readable medium has non-transitory program code recorded thereon which, when executed by the processor(s), causes the processor(s) to perform operations of generating a first mapping of a first set of resource elements to a first channel. The first channel comprises an enhanced physical downlink control channel (ePDCCH) or a physical downlink shared channel (PDSCH). The program code also causes the processor(s) to generate a second mapping of a second set of resource elements to the first channel and to transmit the first channel in accordance with one of the mappings.

Another aspect discloses an apparatus including means for generating a first mapping of a first set of resource elements to a first channel. The first channel comprises an enhanced physical downlink control channel (ePDCCH) or a physical downlink shared channel (PDSCH). The method also includes means for generating a second mapping of a second set of resource elements to the first channel and means for transmitting the first channel in accordance with one of the mappings.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
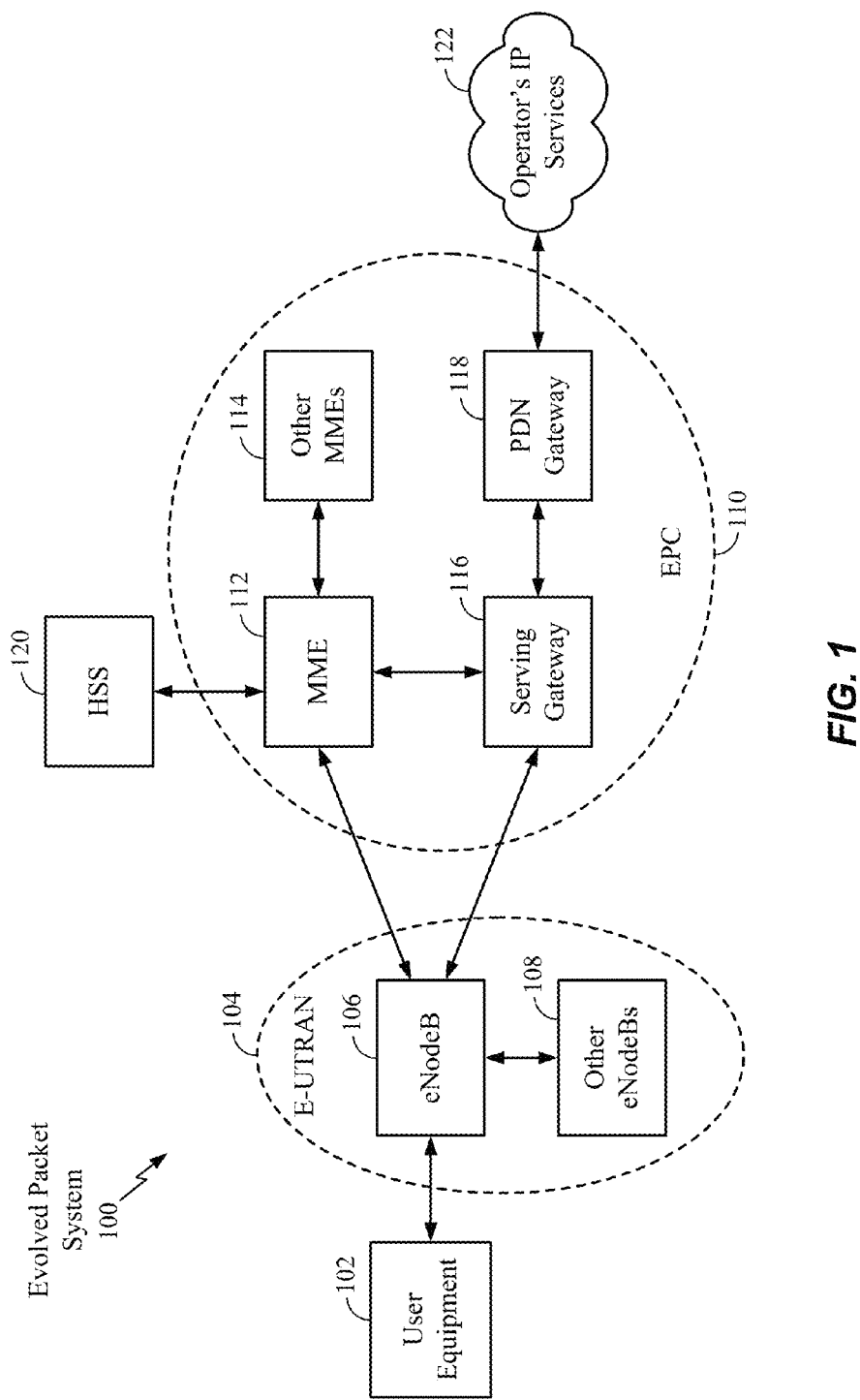
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
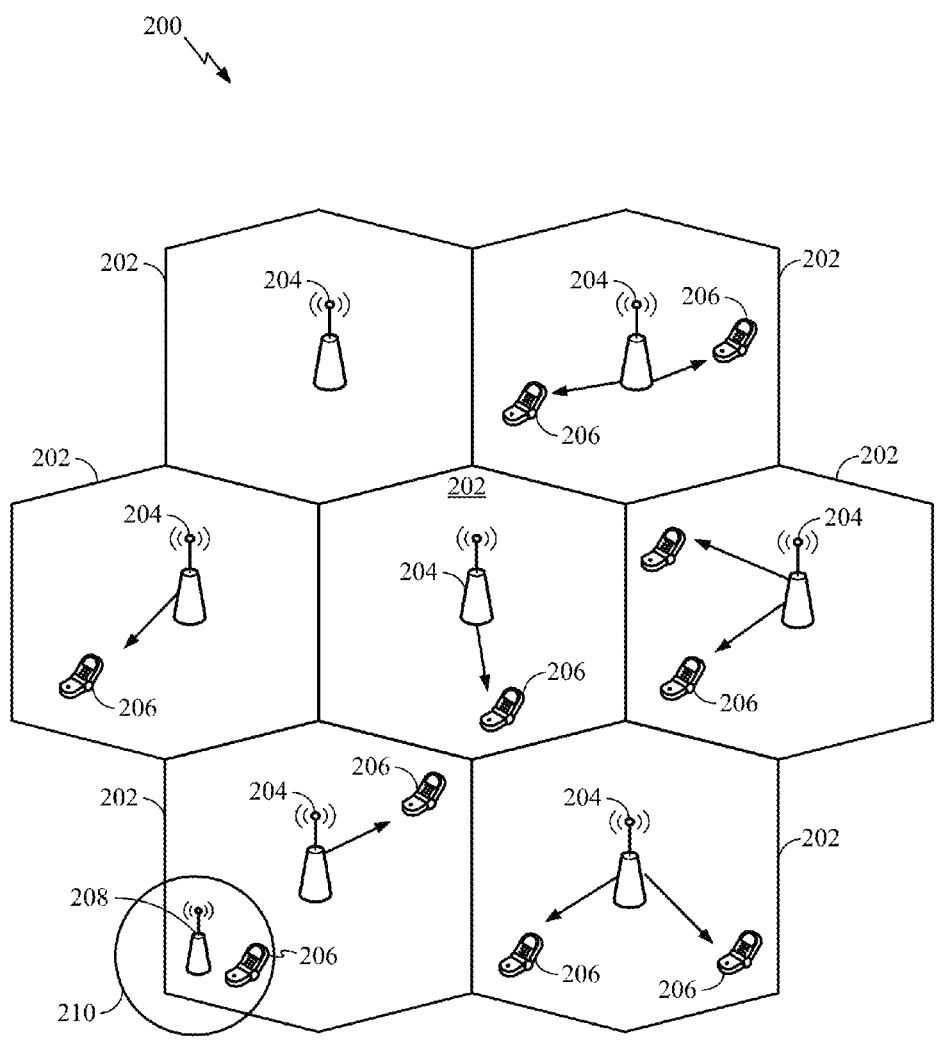
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
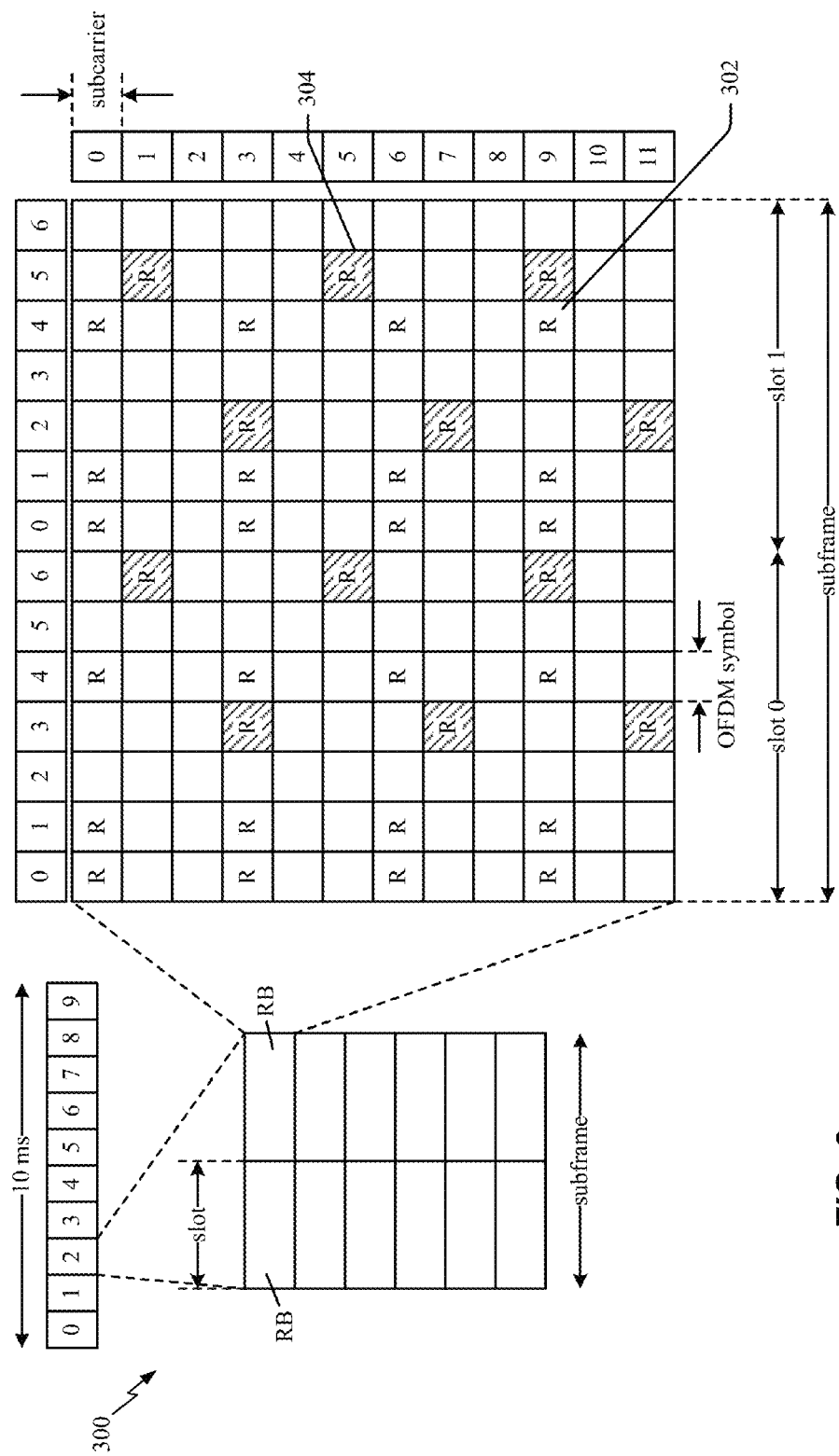
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
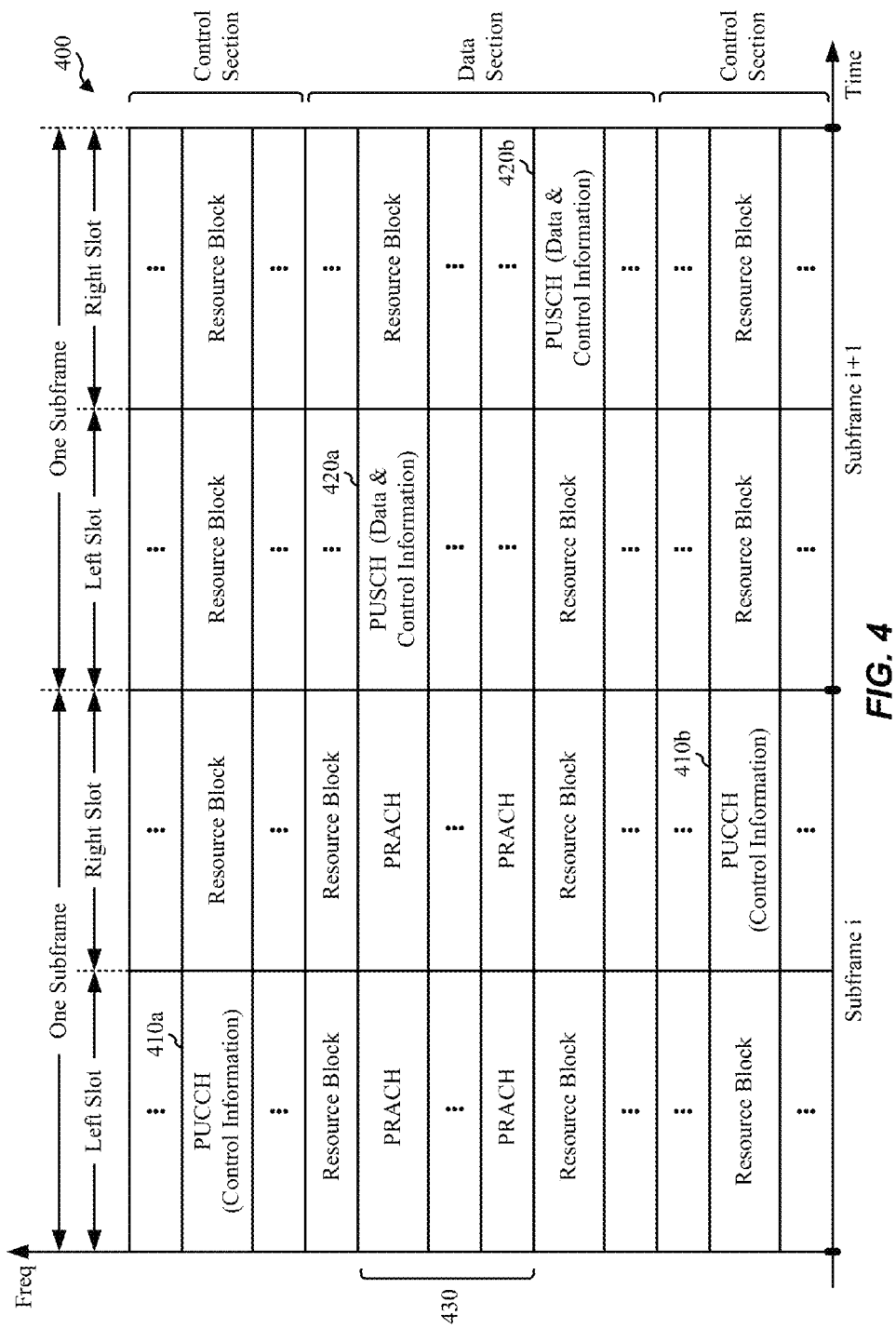
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
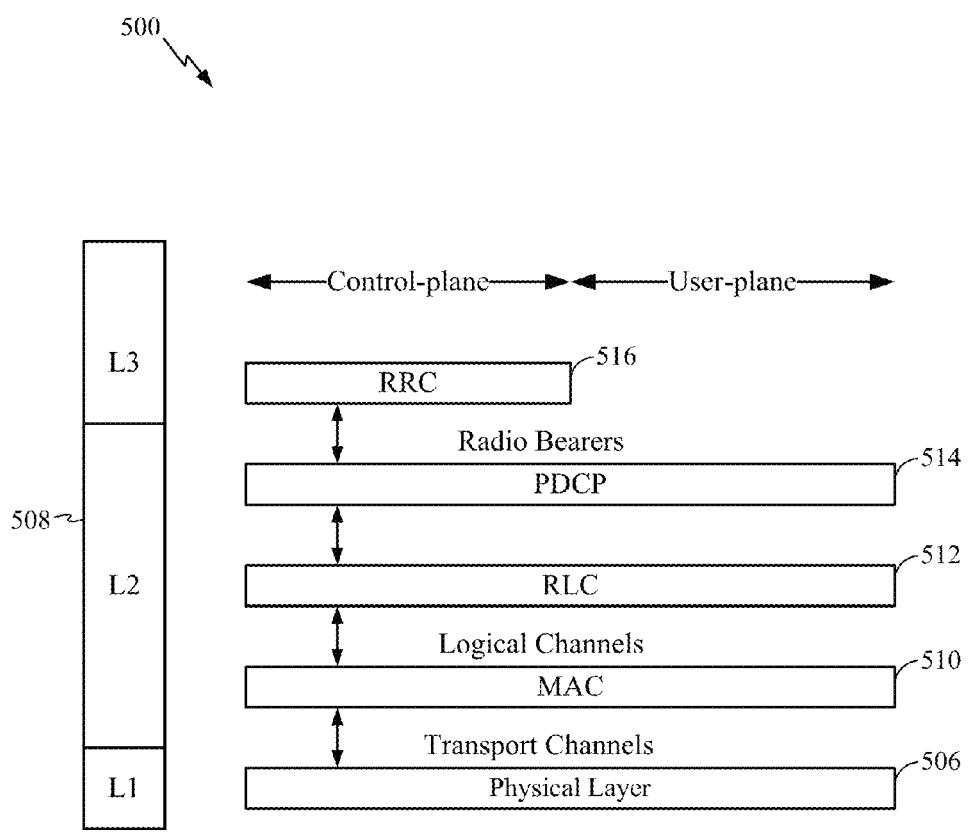
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
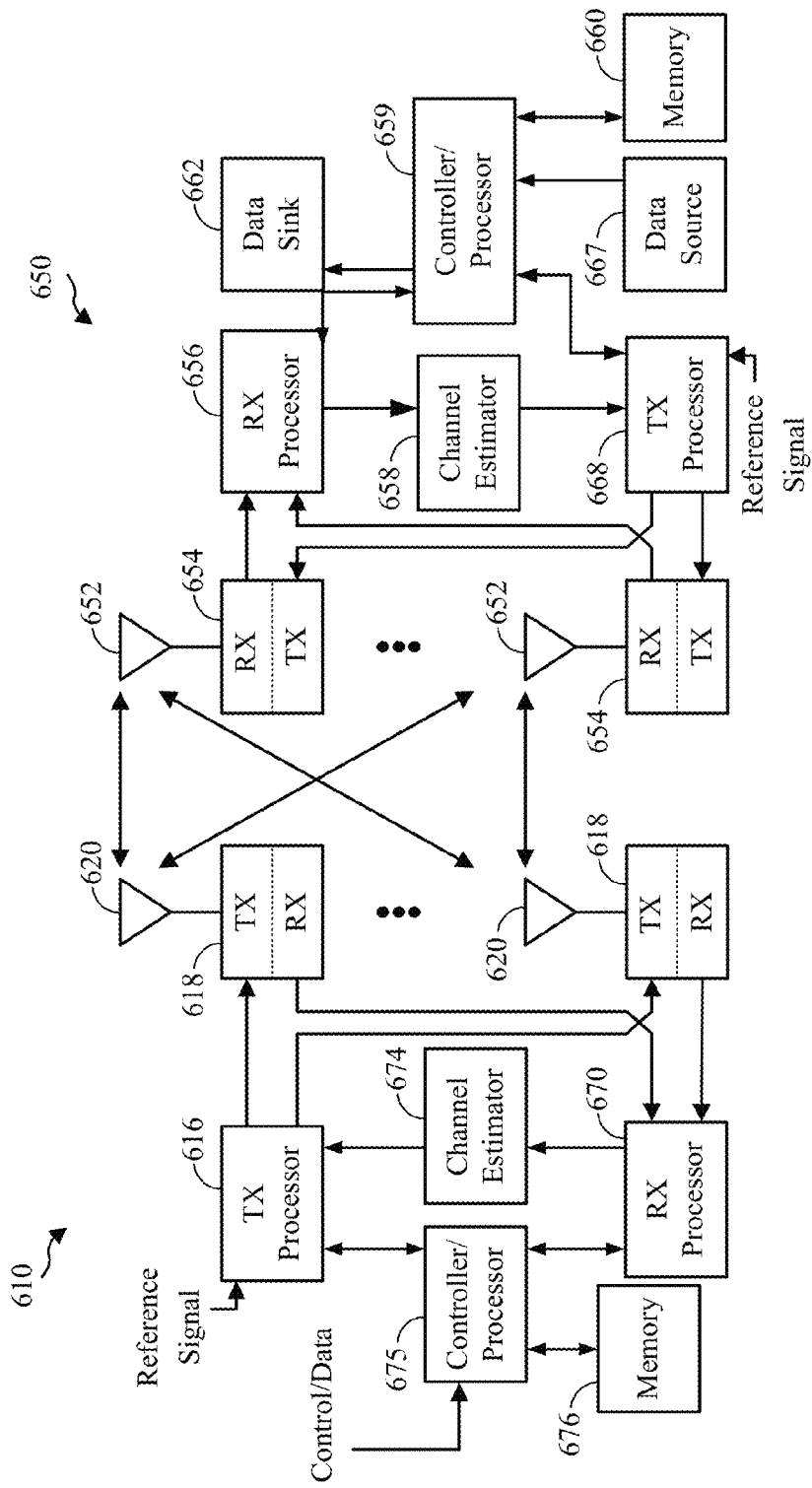
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations Resource Mapping for ePDDCH in LTE In LTE Releases 8/9/10, the physical downlink control channel (PDCCH) is located within the first several symbols (e.g., one, two, three or four) in a subframe and fully distributed across the entire system bandwidth. Additionally, the PDCCH is time domain multiplexed (TDM'ed) with the physical downlink shared channel (PDSCH), which effectively divides a subframe into a control region and a data region.

Release-11 includes other channels, such as an enhanced PDCCH (ePDCCH), enhanced PCFICH (ePCFICH) and an enhanced PHICH (ePHICH). Unlike the legacy PDCCH, which occupies the first several control symbols in a subframe, the ePDCCH occupies the data region, similar to the PDSCH. The ePDCCH aids in increasing control channel capacity, supporting frequency-domain inter-cell interference coordination (ICIC), improving spatial reuse of control channel resources, supporting beamforming and/or diversity, operating on the new carrier type and in MBSFN subframes and in coexisting on the same carrier as legacy UEs.

Figure 7:
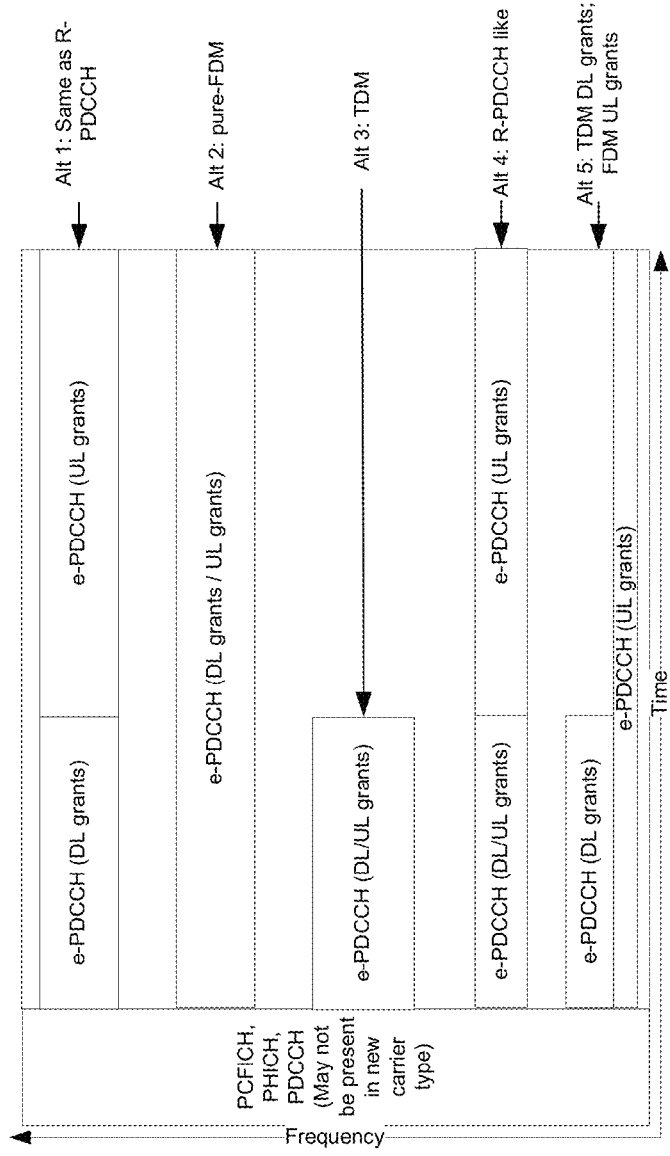
FIG. 7 is a diagram illustrating various ePDCCH structures.

FIG. 7 illustrates various ePDCCH structures. For example, the ePDCCH structure may be the same as the relay physical downlink control channel (R-PDCCH) structure. Alternately, the ePDCCH may be FDM'ed with the data region. Optionally, in an alternate structure, the ePDCCH structure is TDM'ed with the data region. Alternately, the ePDCCH is similar, but not the same as R-PDCCH. In another alternate structure, the ePDCCH may combine TDM and FDM aspects.

Design alternatives to address the resource mapping of ePDCCH in the presence of other signals are described. Other signals may potentially include: common reference signals (CRSs), a legacy control region, primary/secondary synchronization signals (PSS/SSS), physical broadcast channels (PBCHs), PRSs (positioning reference signals), channel state information reference signals (CSI-RSs) and demodulation reference signals (DM-RSs).

One design alternative for ePDDCH resource element mapping includes puncturing the resource elements (REs) having coded symbols. The enhanced resource element group/enhanced control channel element ((e)REG/(e)CCE) includes the resource elements (REs) possibly used by other signals. Each (e)REG/CCE contains a set of resource elements (REs) and is the construction unit for the ePDCCH. The coded symbols of the ePDCCH are mapped to all resource elements in the (e)REG/(e)CCE irrespective of other signals. Other signals may also be transmitted using some resource elements from the (e)REG/(e)CCE, and if so, these resource elements are "punctured" from the ePDCCH perspective (e.g., not used for ePDCCH but instead used for the other signals).

This design alternative makes it possible to use the ePDCCH for a standalone carrier. That is, the UE can possibly decode the ePDCCH (with some performance penalty) without the knowledge of other signals. However, this design impacts ePDCCH performance especially when the coding rate for the ePDCCH is high and when the number of punctured resource elements is large.

In another design for ePDDCH resource element mapping, the resource elements from the (e)REG/(e)CCE are punctured with rate matching in the coding chain. These (e)REGs/(e)CCEs include the resource elements possibly used by other signals, but the coded symbols of the ePDCCH are only mapped to the resource elements not used by other signals (i.e., rate matching is employed).

This design alternative cannot operate with a standalone carrier, but provides a simple definition of the (e)REG/(e)CCE and improved ePDCCH performance. In particular, the definition of the (e)REG/(e)CCE does not vary based on other signals.

To achieve comparable performance to the legacy PDCCH (with 4 possible aggregation levels 1, 2, 4, and 8, where each CCE has a fixed (e.g., 36) available REs), larger aggregation levels for ePDCCH may be involved because the available resource elements in an (e)REG/(e)CCE depend on the presence of other signals. Hence, the (e)REG/(e)CCE size is not fixed. The larger aggregation levels may complicate management of ePDCCH resources. Additionally, the aggregation levels may be subframe dependent, because the presence of other signals may be subframe dependent.

A third design for ePDDCH resource element mapping includes rate matching for the coding chain together with mapping the "(e)REG/(e)CCE" around the other signals. Here, the (e)REG/(e)CCE excludes the resource elements used by other signals, and the coded symbols are only mapped to the resource elements not used by other signals (rate matching).

This design cannot be operated with a standalone carrier, but provides a simple definition of aggregation levels for the ePDCCH and better ePDCCH performance. The number of (e)REGs/(e)CCEs for each physical resource block (PRB) pair may be variable, depending on the presence of other signals.

One aspect of the present disclosure is directed to a resource element mapping for the ePDDCH that may work with a standalone carrier, provide ePDDCH performance and have little impact on the existing LTE standard. In particular, one aspect is directed to re-ordered rate matching. Regardless of whether the (e)REG/(e)CCE definition includes or excludes the resource elements possibly used by other signals, the mapping of coded symbols for the ePDCCH begins with the resource elements not possibly colliding with other signals. The mapping continues with the resource elements possibly colliding with other signals.

In one illustrative example, the ePDCCH uses two eCCEs, where each CCE contains two sets of resource elements. For this example, the first set of resource elements is free of possible collision with other signals (S1_no_collision and S2_no_collision), while the second set may possibly collide with other signals (S1_collision and S2_collision). The two eCCEs may be classified as follows:
  eCCE 1: S1_no_collision, S1_collision
  eCCE 2: S2_no_collision, S2_collision In one aspect, the mapping follows the following order: S1_no_collision, S2_no_collision, S1_collision, S2_collision. With this mapping, the ePDCCH may possibly be decoded by UEs who are not completely aware of the presence of other signals. In this example, each eCCE may have a time span of one subframe. The two eCCEs may have different sets of resource elements.

Another aspect of the present disclosure is directed to a decoding candidate dependent scheme. This aspect does not ensure all ePDCCH decoding candidates are possibly decoded by a UE without complete knowledge of other signals for standalone carrier operation. Rather, this aspect includes a subset of ePDCCH decoding candidates that can possibly be decoded by a UE without complete knowledge of other signals. The remaining ePDCCH decoding candidates are configured to target better ePDCCH performance, such as rate matching based ePDCCH resource element mapping.

In one configuration, the ePDCCH decoding candidates can be classified into two categories: standalone possible and standalone impossible. The classification may be based on: search space (e.g., common search space standalone possible; UE-specific search space not possible); aggregation level (e.g., large aggregation levels standalone possible, low aggregation levels not standalone possible); transmission type (e.g., distributed ePDCCH transmissions are standalone possible; localized ePDCCH not standalone possible); starting (e)CCE indices (e.g., even starting indices standalone possible; odd starting indices not standalone possible); subframe type (e.g., some subframes standalone possible; other subframes not standalone possible); and/or any combination thereof.

Additionally or separately, when a UE is not aware of other signals (e.g., initial access of the system), a puncturing operation is performed. If a UE is already aware of other signals (e.g., via an indication through RRC signaling), a rate matching operation is performed. Different UEs may employ different mapping schemes in a subframe. As an example, one UE may use puncturing based mapping while another UE uses rate-matching based mapping.

Additionally or separately, depending on whether puncturing or rate-matching based resource mapping scheme is used for the ePDCCH, a different interleaving scheme may be utilized for the ePDCCH. For example, for a rate-matching based ePDCCH, the same interleaving scheme as used with a legacy PDCCH can be applied. For a puncturing based ePDCCH, a different interleaving scheme can be applied in order to reduce or minimize the performance impact of puncturing.

For standalone possible ePDCCH decoding candidates, the resource mapping can include allowing successful ePDCCH decoding without the complete knowledge of other signals. For non-standalone possible ePDCCH decoding candidates, the resource mapping can target better ePDCCH performance.

One aspect includes the same definition of the (e)REG/(e)CCE for the two mapping schemes for the two types of ePDCCH decoding candidates. Another aspect includes standalone control channels and also standalone PDSCH channels (at least for some types of PDSCHs). The resource element mapping for the PDSCH can be performed by puncturing (by other signals) based resource mapping and/or by rate matching (around other signals) based resource mapping. For rate matching based resource mapping, the resource mapping for the PDSCH can be performed free of other signals following a specific order (e.g., time first, frequency second). Alternately, the resource mapping may be performed by resource mapping to the resources free of other signals first, followed by mapping to the resources that may potentially carry other signals, as described above with respect to ePDCCH.

For a standalone PDSCH, the resource element mapping may be performed via a puncturing based method or a rate matching based method. Whether PDSCH is standalone or not can be classified by: a radio network temporary identifier (RNTI), (e.g., broadcast RNTIs (SI/P/RA-RNTI standalone possible); unicast/groupcast not possible); transmission type (e.g., distributed PDSCH transmissions are standalone possible; localized PDSCH are not standalone); subframe type (e.g., some subframes standalone possible; other subframes are not); the type of ePDCCH (e.g., if ePDCCH is standalone, PDSCH is also standalone; if the ePDCCH is not standalone, then the PDSCH is not standalone); dynamically indicated via the ePDCCH (e.g., a bit to indicate whether a puncturing or rate-matching based solution is used for the scheduled PDSCH), or any combination thereof.

Additionally or separately, an ePDCCH may indicate whether some other signals are present for the corresponding PDSCH to facilitate the resource mapping operation for the corresponding PDSCH. Additionally or separately, depending on the mapping scheme used for the PDSCH, different coding schemes may be applied. As an example, for a puncturing based PDSCH, convolutional coding can be used. For a rate-matching based PDSCH, turbo coding can be used.

Additionally or separately, depending on the mapping scheme used for PDSCH, different transport block size determination schemes may be utilized. As an example, for rate-matching based PDSCH, the transport block size determination may be based on a modulation and coding scheme (MCS) index and a resource allocation size as part of a control channel assignment. For puncturing based PDSCH, the transport block size determination scheme may be based on an MCS and a resource allocation size as part a control channel assignment, and further based on a scaling factor, which can be predetermined or signaled to a UE.

Additionally or separately, the transport block size determination can be subframe-dependent, in light of possible subframe-dependent presence of other signals. As an example, a scaling factor of different values can be used for different subframes. The set of values can be indicated to the UE via radio resource control (RRC) signaling. In a subframe, different UEs may employ different mapping schemes. As an example, one UE may use puncturing based mapping while another UE uses rate-matching based mapping.

The presence of other signals may be subframe dependent. For example, in a new carrier type, the common reference signal (CRS) may be present only in some subframes (e.g., 1 every 5 subframes). In another example, the channel state information reference signal (CSI-RS) may be present only in some subframes. Additionally, the PSS/SSS may be present in only 1 of every 5 subframes.

Other signals may not be present in the entire bandwidth. For example, the positioning reference signal (PRS) may only be present in a fraction of the bandwidth. Further, the presence of other signals may be cell-specific or UE-specific. For example, CSI-RS may be configured on a per UE basis. Additionally, in another aspect, the amount of resource elements occupied by other signals may be subframe dependent. For example the size of the legacy control region can be subframe dependent.

In the puncturing/rate matching discussion above, the potential presence of other signals may consider a worst case for other signals, an actual presence of other signals, or a combination thereof. For example, a full bandwidth for a positioning reference signal (PRS) may be considered (i.e., worst case) and/or the actual presence of other signals (e.g., PSS/SSS) (i.e., actual presence) may be considered. Some signals may assume the worst case, while some assume the actual presence. As an example, rate matching may be performed for some signals, while puncturing may be performed for some other signals.

Those skilled in the art will understand that although the preceding description was primarily with respect to ePDCCH and PDSCH, the principles apply to other signals, for example ePHICH and ePCFICH.

Figure 8:
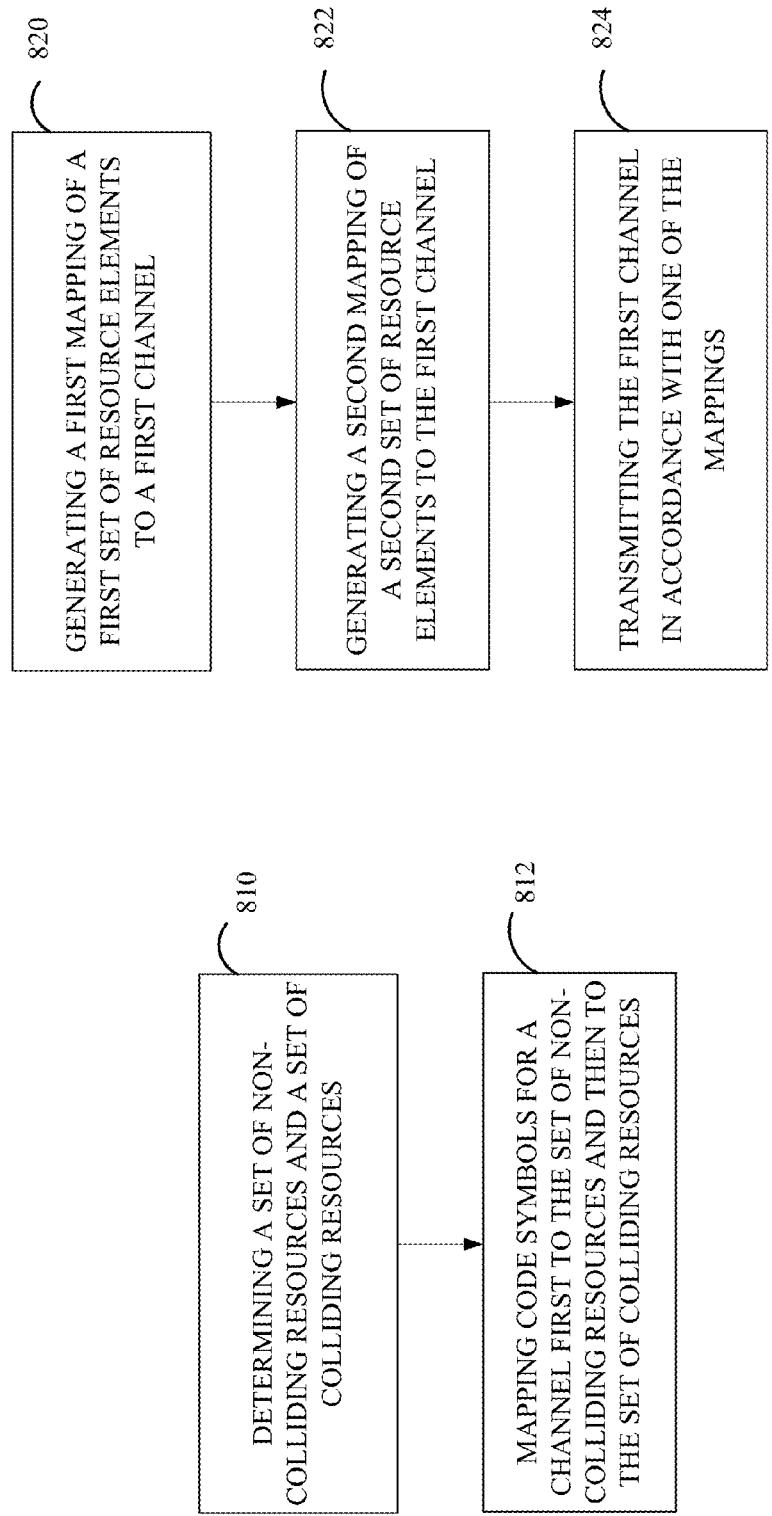
FIGS. 8A and 8B are block diagrams illustrating exemplary methods for mapping ePDCCH to resource elements.

FIGS. 8A-8B illustrate methods of resource mapping for the ePDCCH in LTE. In FIG. 8A, in block 810, a set of non-colliding resources and a set of colliding resources are determined by a base station. Next, in block 812, the base station maps code symbols for the ePDCCH to the non-colliding resources and then to the colliding resources.

In FIG. 8B, in block 820, a base station generates a first mapping of a first set of resource elements to a first channel. The first channel can be the ePDCCH or the PDSCH. In block 822, the base station generates a second mapping of a second set of resource elements to the first channel. Next, in block 822, the base station transmits a first channel in accordance with one of the mappings.

In one configuration, the eNodeB 610 is configured for wireless communication including means for determining. In one aspect, the determining means may be the controller processor 675 and/or memory 646 configured to perform the functions recited by the determining means. The eNodeB 610 is also configured to include a means for mapping. In one aspect, the mapping means may be the controller processor 674 and/or memory 646 configured to perform the functions recited by the mapping means. In another aspect, the aforementioned means may be any module or any apparatus configured to perform the functions recited by the aforementioned means.

In another configuration, the eNodeB 610 is configured for wireless communication including means for generating. In one aspect, the generating means may be the controller processor 675 and/or memory 646 configured to perform the functions recited by the generating means. The eNodeB 610 is also configured to include a means for transmitting. In one aspect, the transmitting means may be the transmit processor 616, 618 transceiver, antenna 620, controller processor 675 and/or memory 676 configured to perform the functions recited by the transmitting means. In another aspect, the aforementioned means may be any module or any apparatus configured to perform the functions recited by the aforementioned means.

Figure 9:
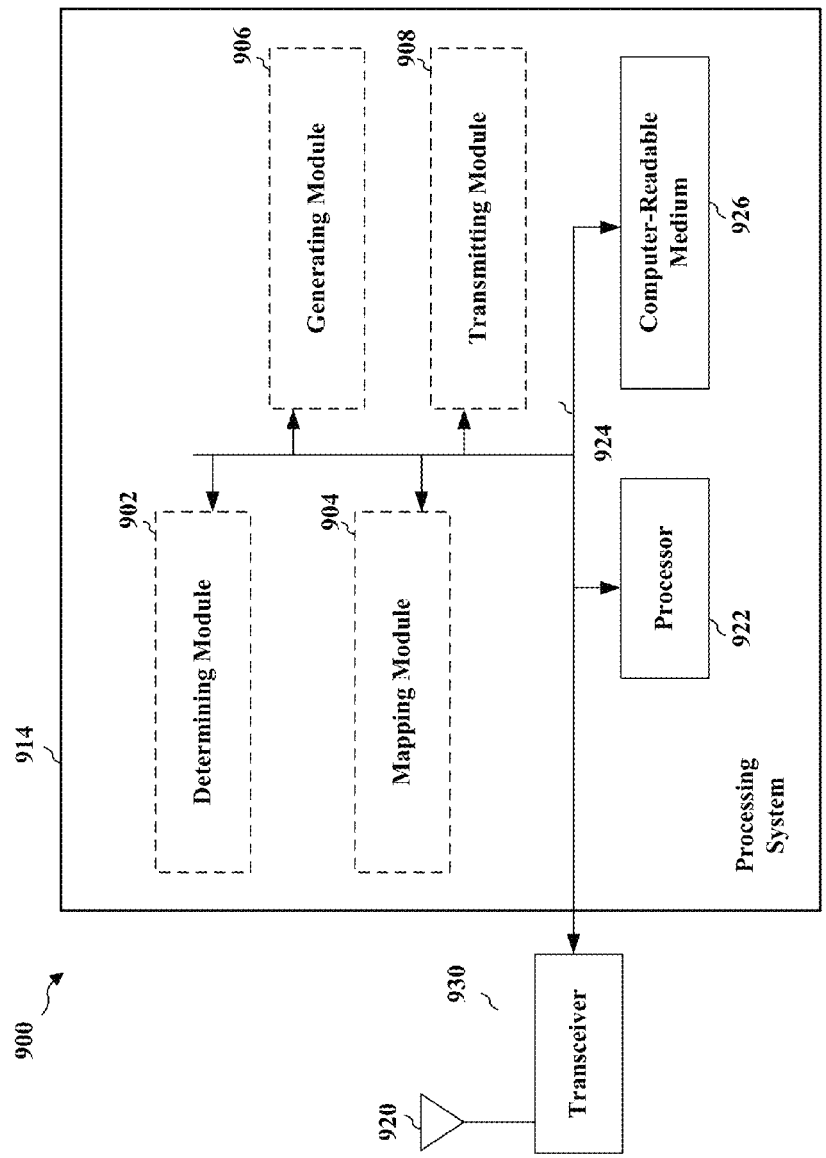
FIG. 9 is a block diagram illustrating exemplary components in an exemplary apparatus.

FIG. 9 is a diagram illustrating an example of a hardware implementation for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 922 and the computer-readable medium 926. The hardware modules may also include one or more of modules 902, 904, 906 and/or 908. The bus 924 may also link various other circuits such as timing sources, peripherals, voltage regulators, and power management circuits, which are well known in the art, and therefore, will not be described any further.

The apparatus includes a processing system 914 coupled to a transceiver 930. The transceiver 930 is coupled to one or more antennas 920. The transceiver 930 enables communicating with various other apparatus over a transmission medium. The processing system 914 includes a processor 922 coupled to a computer-readable medium 926. The processor 922 is responsible for general processing, including the execution of software stored on the computer-readable medium 926. The software, when executed by the processor 922, causes the processing system 914 to perform the various functions described for any particular apparatus. The computer-readable medium 926 may also be used for storing data that is manipulated by the processor 922 when executing software.

In one aspect, the processing system includes a determining module 902 and a mapping module 904. The determining module 902 can determine a set of non-colliding resources and a set of colliding resources. The mapping module 904 can map code symbols for a channel. Alternately, in another aspect, the processing system includes a generating module 906 and a transmitting module 908. The generating module 906 can generate a first mapping of a first set of resource elements to a first channel and a second mapping of a second set of resource elements to the first channel. The transmitting module 908 can transmit the first channel in accordance with the mappings.

The modules may be software modules running in the processor 922, resident/stored in the computer readable medium 926, one or more hardware modules coupled to the processor 922, or some combination thereof. The processing system 914 may be a component of the eNodeB 610 and may include the memory 676, the transmit processor 616, the transceiver 618, the antenna 620, and/or the controller/processor 675.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, at a base station, a first set of resource elements to be allocated to a plurality of enhanced control channel elements (eCCEs), the first set of resource elements selected from a plurality of resource elements of a subframe, and the first set of resource elements excluding resource elements allocated to other signals transmitted in the subframe from the base station, the other signals comprising at least reference signals, synchronization signals, broadcast channels, or a combination thereof;
   determining, at the base station, a second set of resource elements to be allocated to the plurality of eCCEs, the second set selected from the plurality of resource elements of the subframe, the second set of resource elements being allocated to the plurality of eCCEs regardless of whether the second set potentially collides with the other signals transmitted in the subframe from the base station;
   mapping, at the base station, code symbols, for an enhanced physical downlink control channel (ePDCCH), to the plurality of eCCEs comprising resource elements of the first set;
   mapping, at the base station, any remaining code symbols for the ePDCCH, to the plurality of eCCEs comprising at least one resource element of the second set after mapping to the first set; and
   puncturing, at the base station, a colliding resource element of the second set when the colliding resource element collides with at least one signal of the other signals transmitted in the subframe from the base station, such that the ePDCCH is not transmitted on the punctured resource element.

2. A base station for wireless communication, comprising:
   a memory; and
   at least one processor coupled to the memory, the at least one processor being configured:
      to determine a first set of resource elements to be allocated to a plurality of enhanced control channel elements (eCCEs), the first set of resource elements selected from a plurality of resource elements of a subframe, and the first set of resource elements excluding resource elements allocated to other signals transmitted in the subframe from the base station, the other signals comprising at least reference signals, synchronization signals, broadcast channels, or a combination thereof;
      to determine a second set of resource elements to be allocated to the plurality of eCCEs, the second set selected from the plurality of resource elements of the subframe, the second set of resource elements being allocated to the plurality of eCCEs regardless of whether the second set potentially collides with the other signals transmitted in the subframe from the base station;

to map code symbols, for an enhanced physical downlink control channel (ePDCCH), to the plurality of eCCEs comprising resource elements of the first set;

to map any remaining code symbols, for the ePDCCH, to the plurality of eCCEs comprising at least one resource element of the second set after mapping to the first set; and to puncture a colliding resource element of the second set when the colliding resource element collides with at least one signal of the other signals transmitted in the subframe from the base station, such that the ePDCCH is not transmitted on the punctured resource element.

3. A non-transitory computer-readable medium having non-transitory program code recorded thereon, the program code comprising:

program code to determine, at a base station, a first set of resource elements to be allocated to a plurality of enhanced control channel elements (eCCEs), the first set of resource elements selected from a plurality of resource elements of a subframe, and the first set of resource elements excluding resource elements allocated to other signals transmitted in the subframe from the base station, the other signals comprising at least reference signals, synchronization signals, broadcast channels, or a combination thereof;

program code to determine, at the base station, a second set of resource elements to be allocated to the plurality of eCCE, the second set selected from the plurality of resource elements of the subframe, the second set of resource elements being allocated to the plurality of eCCEs regardless of whether the second set potentially collides with the other signals transmitted in the subframe from the base station;

program code to map, at the base station, code symbols, for an enhanced physical downlink control channel (ePDCCH), to the plurality of eCCEs comprising resource elements of the first set;

program code to map, at the base station, any remaining code symbols, for the ePDCCH, to the plurality of eCCEs comprising at least one resource element of the second set after mapping to the first set; and program code to puncture, at the base station, a colliding resource element of the second set when the colliding resource element collides with at least one signal of the other signals transmitted in the subframe from the base station, such that the ePDCCH is not transmitted on the punctured resource element.

* * * * *